United States Patent
Minnich

(10) Patent No.: US 7,334,800 B2
(45) Date of Patent: Feb. 26, 2008

(54) SEAL FOR A GAS TURBINE ENGINE HAVING IMPROVED FLEXIBILITY

(75) Inventor: Mark Minnich, Jupiter, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 19 days.

(21) Appl. No.: 10/907,016

(22) Filed: Mar. 16, 2005

(65) Prior Publication Data

US 2006/0091617 A1    May 4, 2006

Related U.S. Application Data

(60) Provisional application No. 60/623,515, filed on Oct. 29, 2004.

(51) Int. Cl.
*F16J 15/02* (2006.01)
*F16J 15/08* (2006.01)

(52) U.S. Cl. .................. 277/644; 277/650; 277/654
(58) Field of Classification Search ............... 277/650, 277/654, 593, 597, 598, 644; 415/138, 136, 415/173.1, 173.3, 174.2
See application file for complete search history.

(56) References Cited

U.S. PATENT DOCUMENTS

| 2,130,110 | A | * | 9/1938 | Victor et al. | 277/600 |
| 3,975,114 | A | * | 8/1976 | Kalkbrenner | 415/210.1 |
| 4,468,044 | A | * | 8/1984 | Ulmer et al. | 277/596 |
| 4,645,217 | A | * | 2/1987 | Honeycutt et al. | 277/555 |
| 5,449,181 | A | * | 9/1995 | Miyaoh | 277/595 |
| 5,934,687 | A | | 8/1999 | Bagepalli et al. | |
| 5,961,126 | A | * | 10/1999 | Miyaoh | 277/594 |
| 5,997,247 | A | | 12/1999 | Arraitz et al. | |
| 6,199,871 | B1 | | 3/2001 | Lampes | |
| 6,431,825 | B1 | | 8/2002 | McLean | |
| 6,521,373 | B1 | * | 2/2003 | Suzuki et al. | 429/162 |
| 6,994,353 | B2 | * | 2/2006 | Kinoshita | 277/592 |
| 2003/0039542 | A1 | | 2/2003 | Cromer | |

* cited by examiner

*Primary Examiner*—Vishal Patel
(74) *Attorney, Agent, or Firm*—Shook, Hardy & Bacon L.L.P.

(57) ABSTRACT

A seal extending between adjacent slots of a gas turbine engine is disclosed. The seal comprises a plurality of generally planar members fixed together along a central axis. The outer member further comprises rounded ends that encompass the second and plurality of third generally planar members. The seal disclosed herein improves sealing capability by providing a more compliant seal over the prior art while reducing the mechanical loads experienced along the seal weld joint, thereby improving seal durability.

16 Claims, 4 Drawing Sheets

SEAL FOR A GAS TURBINE ENGINE HAVING IMPROVED FLEXIBILITY

This application hereby claims the benefit of U.S. Provisional Patent Application Ser. No. 60/623,515, which was filed Oct. 29, 2004, entitled FLEXIBLE SEAL FOR A GAS TURBINE.

TECHNICAL FIELD

The present invention relates generally to a seal and more specifically towards a flexible seal for preventing the leakage of hot gases in a gas turbine engine.

BACKGROUND OF THE INVENTION

Gas turbine engines typically comprise a compressor, at least one combustor, and a turbine. The pressure of air passing through the compressor is raised through each stage of the compressor and is then directed towards the combustion system. Gas turbine combustion systems mix fuel with the compressed air and ignite this mixture to create hot combustion gases. The hot combustion gases are then directed towards a turbine, which produces work, typically for thrust, or shaft power if the engine shaft is connected to an electrical generator.

The turbine engine is comprised of numerous individual components that are fixed together in order to provide the path through which air and combustion gases pass while undergoing the process of generating the thrust or shaft power previously mentioned. It is imperative that all gaps between these individual components be controlled in order to minimize losses in compressor, combustion, or turbine efficiency due to undesirable leakages. Due to various thermal and mechanical loads on these individual components, often times the sealing region between mating components moves or twists. Therefore, it is imperative that any seal between mating components be compliant to such movement. While various fastening and sealing means are employed to control these leakages, one common means, especially in the turbine section, is the use of individual metallic seals.

Most common metallic seal designs have included individual strips of metal and a metallic cloth seal. Examples of these types of prior art seals are shown in FIGS. 1-3. Referring now to FIGS. 1 and 2, a metallic cloth seal in accordance with U.S. Pat. No. 5,934,687 is shown and hereby incorporated for reference. Metallic cloth seals have become common due to their sealing, wear resistance features, and ease of assembly with the turbine engine. As an example, seal 110 includes a center metal sheet 130 surrounded by cloth layer assemblages 132 and 134. Cloth layers 132 and 134 are attached to metal sheet 130 by a plurality of spot welds 138, which are located towards the outer edges of cloth layers 132 and 134. While this seal design has shown improved resistance to wear, the seal has minimal flexibility, due especially to the locations of spot welds 138. In operation, seal 110 must move and bend as required in order to maintain a seal between mating components. This seal movement imparts a high bending stress on spot welds 138 that has been known to cause the the weld to crack and the cloth layer 132 and 134 to separate from center metal sheet 130.

An alternate prior art gas turbine engine seal is shown in FIG. 3 and consists essentially of a plurality of thin slabs that are movable relative to one another as disclosed in U.S. Pat. No. 5,997,247 and incorporated for reference. The thin slabs 10 are designed to be free to slide and spread out laterally across slot 8 to seal gap 6. However, this seal requires multiple thin slabs which can be an issue in ensuring the proper number of slabs have been installed in the slot. Too few slabs can result in an overly flexible seal that does not maintain an adequate seal and too many slabs can result in an overly stiff seal that does not move as necessary to maintain an adequate seal.

Therefore, in light of the requirements to provide a compliant seal to operate under high temperatures and mechanical loads, an improved seal is desired that overcomes the shortfalls of the prior art.

SUMMARY OF INVENTION

The present invention discloses a seal that extends between adjacent slots of a gas turbine engine. The seal comprises an outer sleeve having a first generally planar member including a length, a first end, a second end, a width extending therebetween, and a first thickness. A second generally planar member is positioned on the opposite side of the first generally planar member and has a raised portion. Extending from proximate the first end to proximate the second end and located in between the first and second generally planar members is a plurality of third generally planar members. The plurality of third generally planar members of the seal are arranged such that they are fixed to both the first and second generally planar members. The various planar members, which are preferably fabricated from relatively thin sections of sheet metal, are secured together by a means such as welding, where the welds are located generally along a centerline. The use of multiple planar members secured together along the seal centerline provides a device capable of sealing slots between adjacent engine components, that has the required flexibility to conform to mechanical and thermal loads, while having significantly lower stresses along the weld joint region.

In accordance with these and other objects, which will become apparent hereinafter, the instant invention will now be described with particular reference to the accompanying drawings.

DETAILED DESCRIPTION OF THE PREFERRED EMBODIMENT

Figure 1:
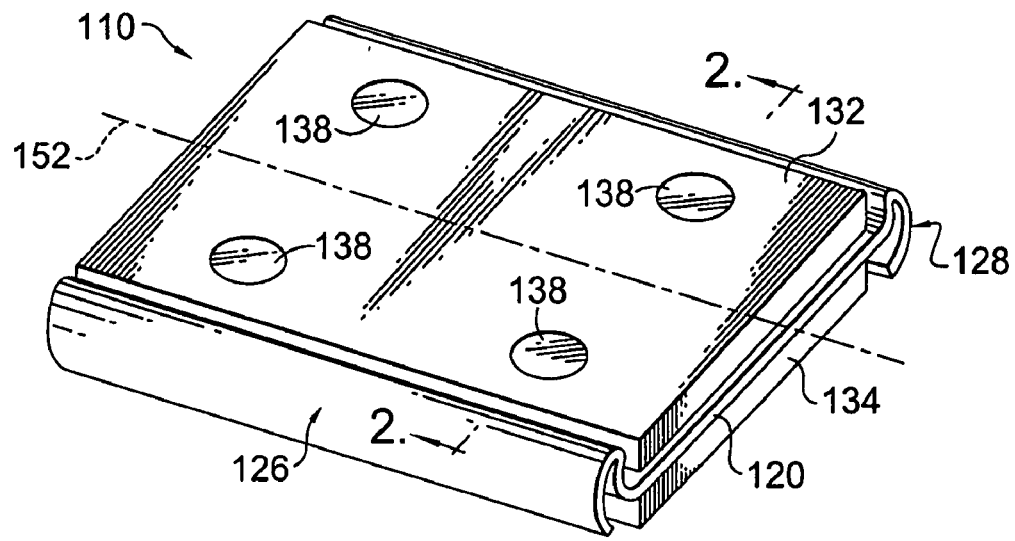
FIG. 1 is a perspective view of a portion of a prior art metallic seal for a gas turbine engine.
Figure 2:
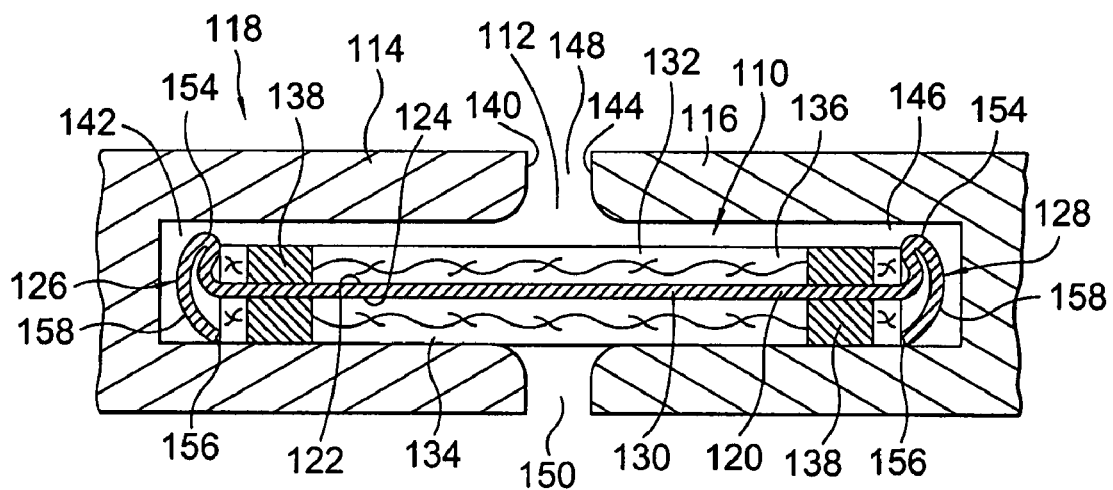
FIG. 2 is a cross section view of FIG. 1 of a prior art metallic seal for a gas turbine engine.
Figure 3:
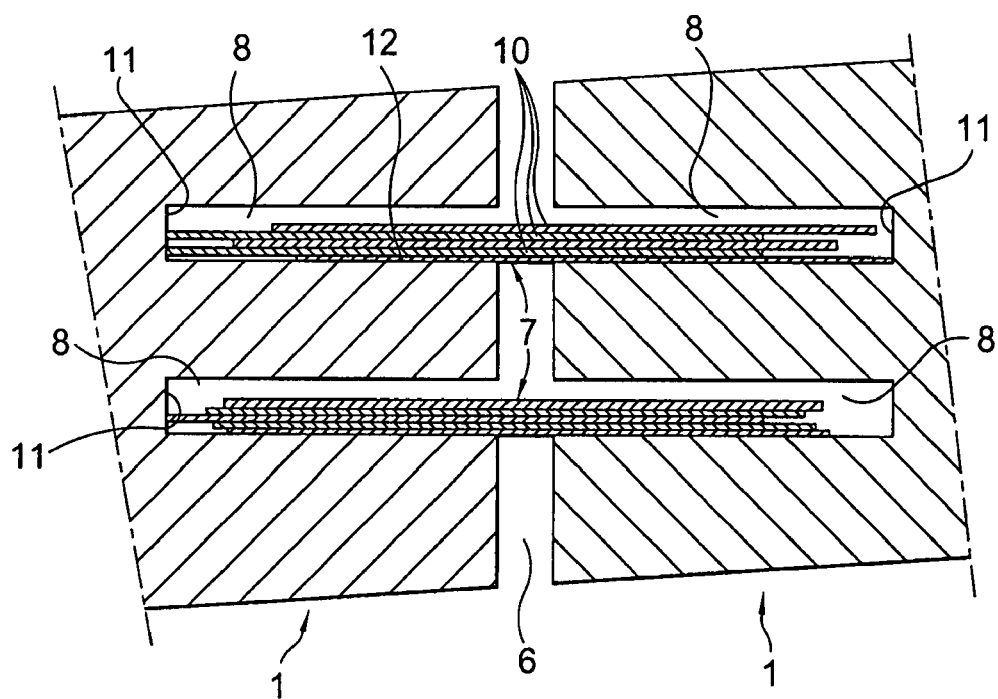
FIG. 3 is a cross section view an alternate prior art metallic seal for a gas turbine engine.
Figure 4:
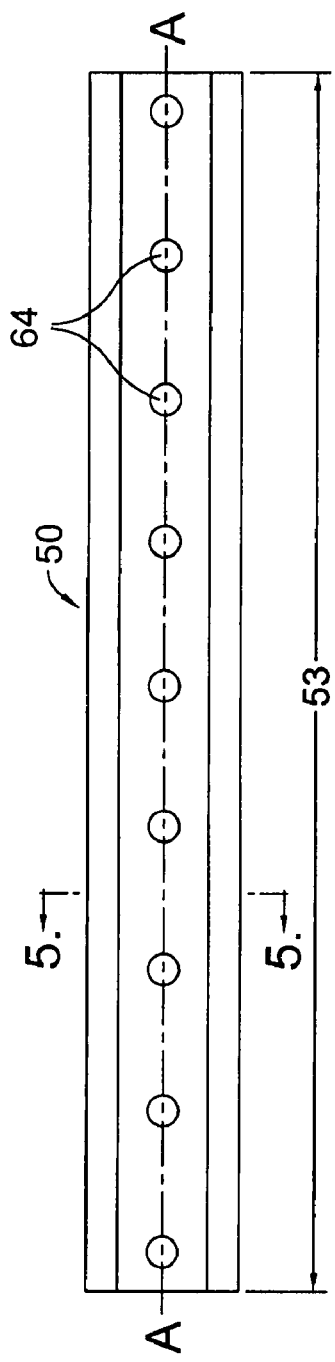
FIG. 4 is an elevation view of a seal in accordance with the preferred embodiment of the present invention.
Figure 5:
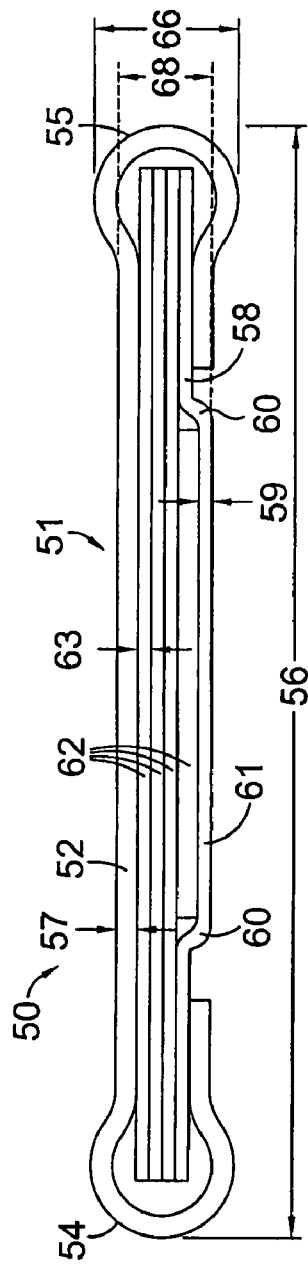
FIG. 5 is a cross section view of FIG. 4 of a seal in accordance with the preferred embodiment of the present invention.
Figure 6:
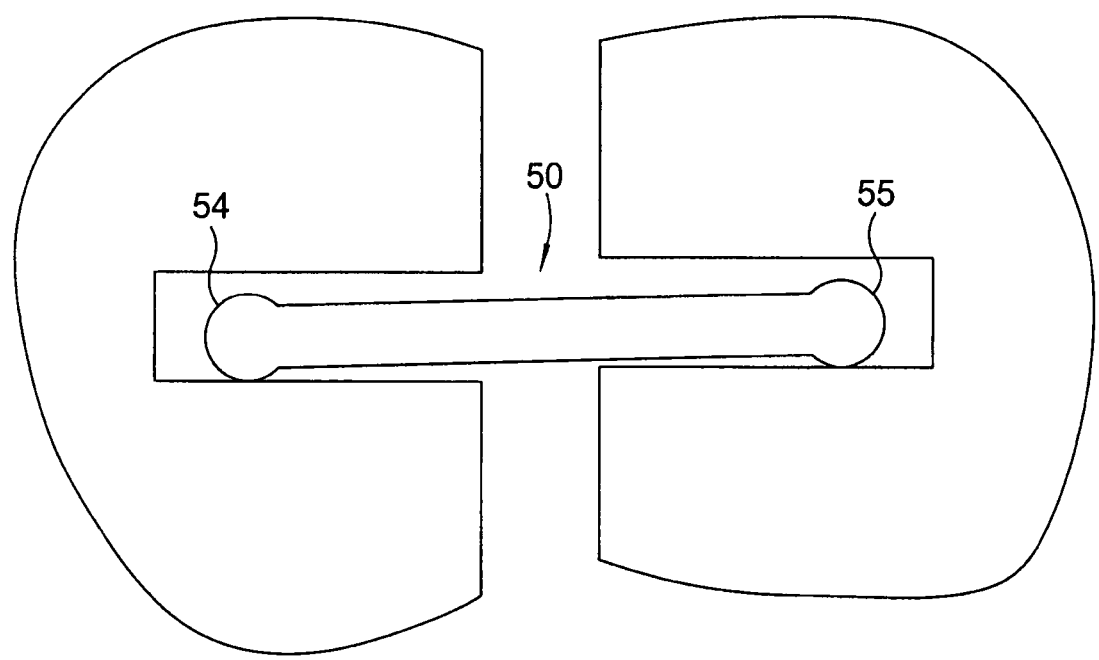
FIG. 6 is a cross section view of a slot region of a gas turbine engine utilizing a seal in accordance with the preferred embodiment of the present invention.

The preferred embodiment of the present invention is shown in detail in FIGS. 4-6. FIG. 4 depicts an elevation view of seal 50 in accordance with the preferred embodiment of the present invention with FIG. 5 taken as a cross section through the elevation view of FIG. 4. Seal 50 comprises an outer sleeve 51 having a first generally planar member 52 including length 53, first rounded end 54, second rounded end 55, and width 56 extending therebetween. Outer sleeve 52 also has a first thickness 57. Seal 50 further comprises a second generally planar member 58 that is opposite, yet substantially parallel to first generally planar member 51, as is shown in FIG. 5. Second generally planar member 58 has a second thickness 59 and at least one step 60 thereby forming a raised portion 61 of second generally planar member 58.

Located in between first generally planar member 52 and second generally planar member 58 is a plurality of third generally planar members 62 that each have a third thickness 63 and extend from proximate first end 54 to proximate second end 55. Depending on the dimensions of the slot in which the seal is to be placed as well as the desired amount of seal movement, the number of third generally planar members can vary. However, in the preferred embodiment, three members are utilized in between first and second generally planar members as well as a shorter member that is located within the raised portion 61 of second generally planar member 58. The more pliability desired will utilize fewer third generally planar members while a stiffer seal design will require more third generally planar members, for a given member thickness. In order to overcome the shortcomings of the prior art seal, in which multiple slabs can move relative to one another, the present invention fixes third generally planar members 62 to first and second generally planar members 52 and 58, respectively. These planar members can be affixed by a variety of means, but the preferred means is through a plurality of spot welds 64, as shown in FIG. 4. As one skilled in the art understands, in order to make a complete spot weld, there cannot be a gap between the raised portion 61, the first generally planar member 52 opposite of the raised portion and the plurality of third generally planar members 62 located therebetween. Otherwise, the welding current cannot pass through all surfaces that are to be welded.

The preferred embodiment of the present invention further incorporates substantially rounded first and second ends, 54 and 55, as shown in FIG. 5, such that a portion of second generally planar member 58 and plurality of third generally planar members are enclosed. Rounded ends to outer sleeve 51 have been incorporated for multiple reasons. First, the rounded ends provide a more compliant point of contact for the seal against the slot as shown in FIG. 6, which is beneficial during seal installation and engine operation. Second, the ends of various sheet members stacked in between the first and second generally planar members are protected from contacting adjacent hardware that could damage the assembled members by trying to pry the members apart. The rounded ends have, by nature, a height 66 when viewed in cross section, as shown in FIG. 5. The ends 54 and 55 are rounded completely on both the outer-most side of the seal and partially rounded on the inner side (the side closest to centerline A-A). As such, the height 66 of the rounded ends 54 and 55 is greater than the summation of thicknesses of first generally planar member 52, second generally planar member 58, and plurality of third generally planar members 62 (as indicated by thickness 57, 59, and 63, respectively). This can be seen in FIG. 5. These thicknesses, when stacked together and including any change in seal geometry, as shown in FIG. 5, have by nature a height 68. The height 66 of the rounded ends 54 and 55 is greater than any height 68 along the width 56 of the seal. The seal must have this relative height configuration between the rounded ends 54 and 55 and the seal width 56 so as to comply with the operational requirement described above wherein the rounded ends serve as the point of contact for the seal (see FIG. 6). As shown in FIG. 6, it is the rounded ends that provide the contact surfaces for the seal in a slot, not the generally planar members.

A further benefit of the rounded ends of outer sleeve 51 is with respect to the position of welds 64. Seal 50 further comprises a centerline A-A, as shown in FIG. 4, that extends along length 53. By positioning welds 64 along centerline A-A, a neutral axis is established allowing the seal ends, which are contacting the slot, to twist about centerline A-A, such that it is compliant to slot movement without overstressing the weld joints. One skilled in the art of sheet metal fabrication and welding will understand that the size and spacing of welds 64 depend on the material and thickness of that which is being welded.

Depending on the operating requirements, the seal material and respective member thickness can vary. However, it is preferred that seal 50 is fabricated from a high temperature alloy such as Haynes 188. Furthermore, due to outer sleeve 51 serving as the outermost layer and generally the region of contact with an engine seal slot, it is preferred that first thickness 57 is greater than both second thickness 59 and third thickness 63. Accordingly, outer sleeve 51 is fabricated from a sheet having a first thickness between 0.015 inches and 0.050 inches while second and third generally planar members 58 and 62 are fabricated from a sheet having a second and third thickness, respectively, of between 0.010 inches and 0.040 inches.

The configuration presented in the preferred embodiment of the present invention provides for a gas turbine seal fabricated from a plurality of generally planar members, preferably spot welded together along a neutral axis. As a result, the seal, which provides a seal to reduce or eliminate undesirable leakage resulting in engine performance loss, has improved shear and bending capability while reducing the stress loads applied to the weld joints.

While the invention has been described in what is known as presently the preferred embodiment, it is to be understood that the invention is not limited to the disclosed embodiment but, on the contrary, is intended to cover various modifications and equivalent arrangements within the scope of the following claims.

What is claimed is:

1. A seal extending between adjacent slots of a gas turbine engine, said seal comprising:

an outer sleeve having a first generally planar member including a length, a width, and a first thickness, a first rounded end and a second rounded end, each of said rounded ends having a height, said width extending between said first and second ends;

a second generally planar member opposite said first generally planar member and extending generally between said first rounded end and said second rounded end, said second member having a second thickness and at least one step, thereby forming a raised portion of said second generally planar member;

a plurality of third generally planar members having a third thickness with at least one of said third members positioned within said raised portion of said second member;

a centerline extending along said length of said first planar member of said outer sleeve; and, wherein at least one of said plurality of third generally planar members and said second generally planar member extend to a position within said first and second rounded ends and are fixed to said first generally planar member only along said centerline, such that said height of said rounded ends is greater than any other height along said width of said seal between said rounded ends.

2. The seal of claim 1 wherein said plurality of third members comprises three members.

3. The seal of claim 1 wherein said first, second, and plurality of third generally planar members are fixed together by a means such as welding through each of said generally planar member thicknesses.

4. The seal of claim 1 wherein said first thickness is greater than said second thickness and said third thickness.

5. The seal of claim 1 wherein said seal is fabricated from a high temperature cobalt-based alloy.

6. The seal of claim 5 wherein said outer sleeve is fabricated from a sheet having a first thickness between 0.015 inches and 0.050 inches.

7. The seal of claim 5 wherein said second and third generally planar members are fabricated from a sheet having a second and third thickness, respectively, between 0.010 inches and 0.040 inches.

8. The seal of claim 1 wherein said rounded ends of said seal are in contact with at least one wall of each of said adjacent slots.

9. A seal extending between adjacent slots of a gas turbine engine, said seal comprising:
   an outer sleeve having a first generally planar member including a length, a width, and a first thickness, a substantially rounded first end, a substantially rounded second end, each of said rounded ends having a height, said width extending between said first end and said second end;
   a second generally planar member opposite said first generally planar member and extending generally between said first end and said second end, said second member having a second thickness and at least one step, thereby forming a raised portion of said second generally planar member;
   a plurality of third generally planar members having a third thickness with at least one of said third members positioned immediately adjacent to and within said raised portion of said second member;
   a centerline extending along said length of said first planar member of said outer sleeve; and,
   wherein said second generally planar member and at least one of said plurality of third generally planar members extend to a position within said first and second rounded ends, such that portions of said second planar member and at least one of said plurality of third generally planar members are enclosed by said substantially rounded first and second ends of said outer sleeve, said second generally planar member and at least one of said plurality of third generally planar members are fixed to said first generally planar member only along said centerline, and wherein said height of said rounded ends is greater than any other height along said width of said seal between said rounded ends.

10. The seal of claim 9 wherein said plurality of third members comprises three members.

11. The seal of claim 9 wherein said first, second, and plurality of third generally planar members are fixed together by a means such as welding through each of said generally planar member thicknesses.

12. The seal of claim 9 wherein said first thickness is greater than said second thickness and said third thickness.

13. The seal of claim 9 wherein said seal is fabricated from a high temperature cobalt-based alloy.

14. The seal of claim 13 wherein said outer sleeve is fabricated from a sheet having a first thickness between 0.015 inches and 0.050 inches.

15. The seal of claim 13 wherein said second and third generally planar members are fabricated from a sheet having a second and third thickness, respectively, between 0.010 inches and 0.040 inches.

16. The seal of claim 9 wherein said rounded ends of said seal are in contact with at least one wall of each of said adjacent slots.

* * * * *